United States Patent [19]

Neuschel

[11] 3,935,982
[45] Feb. 3, 1976

[54] WIRE INSERTING APPARATUS FOR TIRE TREADS

[76] Inventor: James K. Neuschel, 5 Park St., Richfield Springs, N.Y. 13439

[22] Filed: Feb. 21, 1975

[21] Appl. No.: 551,777

[52] U.S. Cl. .............................. 227/101; 29/212 T
[51] Int. Cl.² ............................................ B27F 7/14
[58] Field of Search ............ 227/99, 100, 101, 102; 29/208 F, 211 R, 212 T; 157/13

[56] References Cited
UNITED STATES PATENTS

| | | | |
|---|---|---|---|
| 315,052 | 4/1885 | Morris | 227/101 |
| 1,949,108 | 2/1934 | Paxton | 227/100 X |
| 2,891,605 | 6/1959 | Love | 157/13 |

Primary Examiner—Granville Y. Custer, Jr.
Attorney, Agent, or Firm—Bruns & Jenney

[57] ABSTRACT

An apparatus for inserting wire staples in tread rubber so that the positioning of the staples conforms to a particular tread design. The apparatus includes a supporting bench and drive rollers to move the tread rubber lengthwise along the bench. The tread rubber passes beneath a staple driver that is movable transversely with respect to the rubber. Mounted on the shaft of one of the drive rollers is a tread design cam that is constructed to coordinate with the particular tread design. A follower for this cam is operably connected to the staple driver whereby the positioning of the staples that are inserted conforms to the tread design.

8 Claims, 6 Drawing Figures

WIRE INSERTING APPARATUS FOR TIRE TREADS

BACKGROUND OF THE INVENTION

This invention relates generally to tire retreading, and has particular reference to a novel apparatus for inserting wire staples in tread rubber so that the positioning of the staples conforms to a particular tread design.

Heretofore, it has been relatively common practice to embed non-rubber materials in the tread portions of tires to improve traction, particularly where the tire is intended for winter driving. One of the materials that has been used most often is metal which is employed in the form of studs, continuous coils and in wool form.

Metal studs have the disadvantage of working their way out of the tires and of being noisy on dry pavement. Continuous coils and the like usually require a break-in period and when used in retreading are difficult to cut. The metal wool complicates the manufacture of tires; in addition, there is a question as to the degree of its effectiveness.

SUMMARY OF THE INVENTION

The present invention provides a relatively simple apparatus for inserting wire staples of a suitable gauge in tire tread rubber to improve its performance. Thus, the staples improve traction, improve heat dissipation and minimize the possibility of deep cuts. More particularly, the invention provides apparatus for inserting staples in tread rubber so that the positioning of the staples conforms to a particular tread design, i.e., the staples are inserted in the lands or raised areas of the tread rather than in the grooves.

The apparatus includes a supporting bench and drive rollers to move the tread rubber lengthwise along the bench. The tread rubber is fed under a staple driver that is movable transversely with respect to the rubber. Mounted on the shaft of one of the drive rollers is a preselected tread design cam that is constructed to coordinate with the particular tread design that is already in the tread rubber or will thereafter be molded into it. Associated with the tread design cam is a cam follower that is connected to the staple driver and controls its transverse movement whereby the positioning of the staples in the tread rubber conforms to the tread design.

DESCRIPTION OF THE PREFERRED EMBODIMENTS

Figure 2:
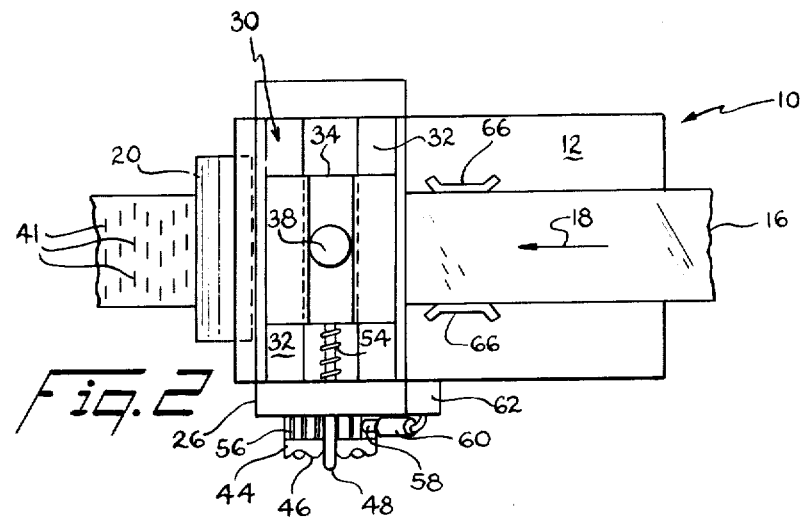
FIG. 2 is a top plan view of the apparatus.

Having reference now to the drawings, the wire inserting apparatus includes a support for the tread rubber in the form of a table or bench 10 having a top 12 and legs 14. The tread rubber 16 is moved lengthwise along the table in the direction of arrows 18, FIGS. 2 and 3, by rollers 20 and 22. The primary drive roller 22, which also serves as an anvil, projects up through a cut-out 24, FIG. 3, in the table so that its circumference at the top is flush with the top of the table. Roller 22 is driven by any suitable means to advance the tread rubber at the speed desired. Roller 20 is a spring or air loaded presser roller of conventional construction.

Figure 4:
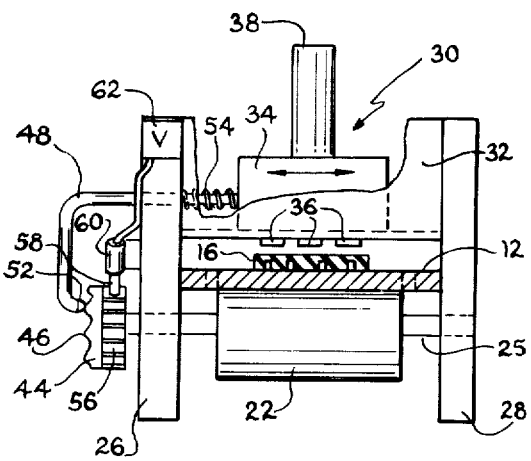
FIG. 4 is a vertical section taken on line 4—4 of FIG. 1.

The shaft 25 for the drive roller 22 is journalled in a pair of upright support members 26 and 28 located as shown on opposite sides of the table 10. Above the table, the members 26, 28 support a staple driver 30 on a pair of spaced, L-shaped tracks or guideways 32, the tracks being secured at their ends to the support members as best shown in FIGS. 2 and 4. The staple driver is adapted to have limited back and forth movement on the tracks 32 which movement is perpendicular to the direction of travel of the tread rubber 16.

The staple driver 30 includes a carriage 34 that rests on the tracks 32, a plurality of staple heads 36 and an air piston 38 for actuating the staple heads. The staple heads and staples used in the heads are commercially available items, as from Bostitch, and per se play no part of the invention. As best shown in FIG. 4, the staple heads 36 project down from the carriage and extend between the spaced tracks 32 to points just above the tread rubber 16.

Figure 6:
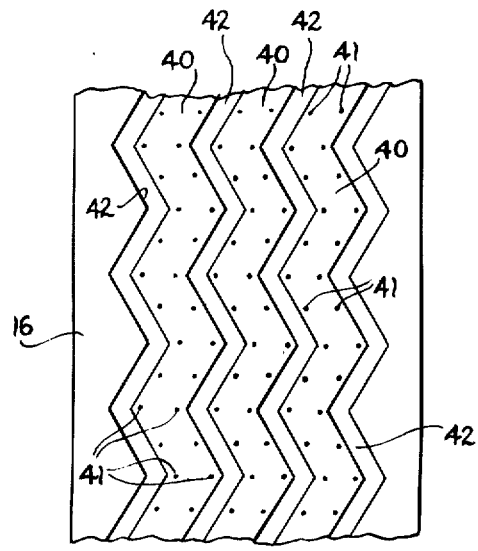
FIG. 6 is an enlarged top plan view of a piece of tread rubber in which staples have been inserted.

The carriage 34 is constructed so that the number of staple heads 36 and the spacing between them can be varied as required for different tread designs. In this connection, reference is made to FIG. 6 showing a piece of tread rubber 16 that has three circumferential ribs 40 arranged in a zig-zag design. To insert a series of staples 41 in each rib or land 40, three staple heads 36 would be required as shown in FIG. 4 and the spacing between the heads would be adjusted so that the staples, which are preferably 14 or 16 gauge, are inserted wholly within the ribs, equidistant from the longitudinal edges thereof.

Since designs as shown in FIG. 6 are common in tire treads, it will be apparent that provision should be made to prevent parts of staples from being inserted in non-road engaging areas of the treads such as the grooves 42 that are disposed on opposite sides of the ribs 40. In accord with the invention, this is done by moving the staple driver 30 back and forth on the tracks 32 in a pattern that conforms to the tread design. To this end, a tread design cam 44 is provided for each different tread design in which staples may be inserted, and this controls the movement of the staple driver as will be explained.

The tread design cam 44 is fixed on the shaft 25 of the drive roller 22 outside the support member 26. Thus, the cam is driven at the same speed as the roller. Cam 44 is a disc formed with an outwardly projecting annular flange 46 in which lobes and recesses are machined as indicated in FIGS. 2–4.

Figure 1:
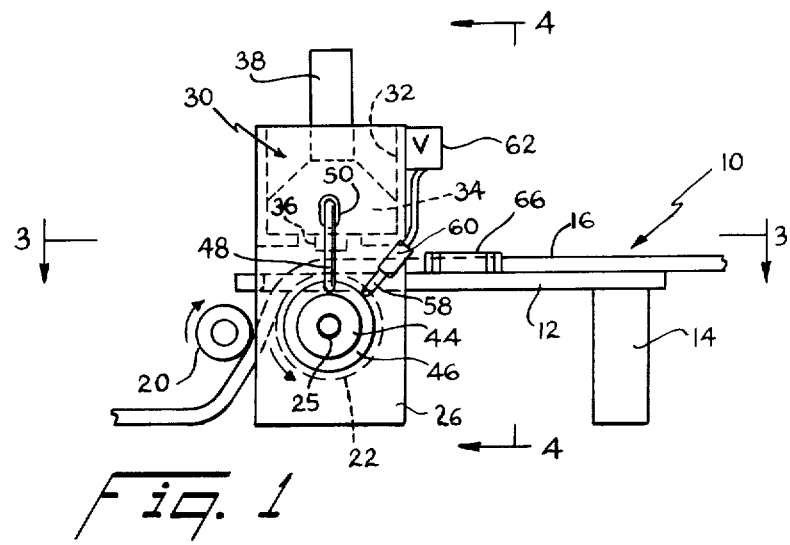
FIG. 1 is a side elevation of a wire inserting apparatus embodying the invention.

Coacting with the tread design cam 44 is a bent rod cam follower 48 that is secured at its upper end to the staple driver carriage 34, the follower passing with a free fit through an aperture 50, FIG. 1, in support member 26. The lower, inwardly turned end 52 of the follower is smoothly rounded and bears against the machined surface of the cam flange 46, the follower being biased into engagement therewith by a compression spring 54, FIGS. 2 and 4, that is mounted on the follower between support member 26 and the carriage 34. The pattern of lobes and recesses that is formed in each cam is such that as the cam rotates it, acting through the cam follower 48, causes the staple driver carriage to move back and forth in a pattern that conforms to a particular tread design whereby the staples are inserted in the rib or other raised portions of the tread and not in the groove areas.

Figure 3:
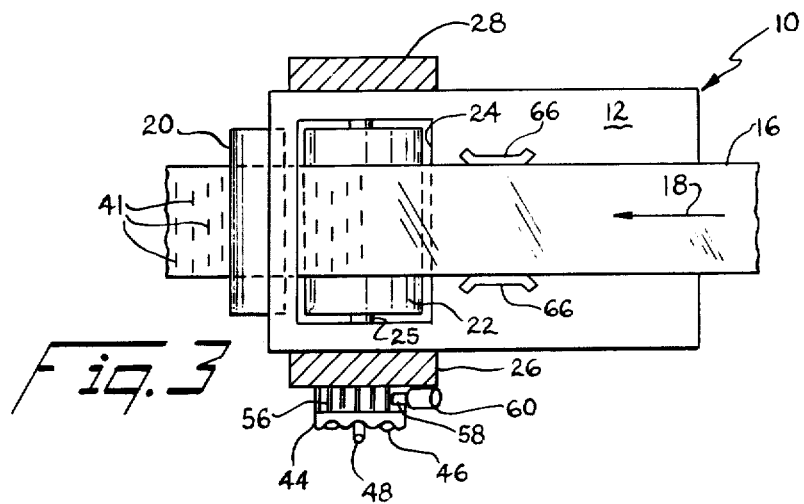
FIG. 3 is a horizontal section taken on line 3—3 of FIG. 1.

The spacing of the staples in the tread rubber is controlled by a spacing cam 56 which, in the embodiment disclosed, is fixed on the drive roller shaft 25 inside the tread design cam 44, FIGS. 2–4. The spacing cam has a uniformly scalloped edge that is engaged by a follower 58 which acts in conjunction with a switch 60. Thus, each time the follower rides over a cam lobe it closes the switch and this in turn actuates a solenoid valve 62 which causes the air piston 38 to actuate the staple heads 36. The electrical and fluid connections for the valve 62 and air piston are conventional and therefore not shown. As will be understood, different spacing cams will be provided for achieving different intervals of staple insertion.

The apparatus that has been described can be used for inserting staples in tread rubber before the tread design has been molded in the rubber. This only requires knowing in advance what the design is going to be and then using the tread design and spacing cams for that design. In such case, tread rubber in a semi-plastic state is fed through the apparatus and the staples are inserted as described above. After a predetermined length of the rubber has passed through the apparatus, it is cut and then placed in a heated mold and cured under pressure in a manner well known in the art.

The apparatus of the invention can also be utilized for inserting staples in pre-cured tread rubber which is tread rubber that has already been cured and has its tread design when purchased by the tire retreader. This is sometimes called "cold rubber" and the process of applying it to a prepared tire carcass is called "cold capping". In this case, the tread design and spacing cams for the particular design that is in the rubber are installed on the apparatus and the tread rubber with the tread design facing down, i.e. in contact with the table top, is fed through the apparatus.

Figure 5:
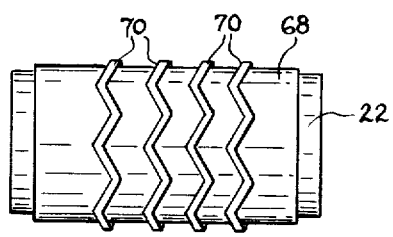
FIG. 5 is a side elevation of a modified form of the primary drive roller.

While the apparatus is provided with adjustable guides 66 for properly locating the tread rubber transversely with respect to the staple driver 30, still more precise registry with the staple inserting mechanism can be obtained with the modification shown in FIG. 5. This is for use with pre-cured tread rubber and comprises a sleeve 68 mounted on the drive roller 22, the sleeve having a design in relief that complements the particular tread rubber design. For a tread rubber design as shown in FIG. 5, the sleeve 68 would have four narrow raised ribs 70 that would project above the table and into the tread grooves 42, the sleeve and tread design in effect "meshing" with one another to positively and precisely locate the tread rubber. Obviously, for each tread rubber design used it will be necessary to have a sleeve 68 with a complementary design.

From the foregoing description it will be apparent that the invention provides a novel and very advantageous apparatus for inserting wire elements in tread rubber thereby improving the performance of same. As will be understood by those familiar with the art, the invention may be embodied in other specific forms without departing from the spirit or essential characteristics thereof.

I claim:

1. In an apparatus for inserting wire elements in tread rubber, support means for the tread rubber, means to advance the tread rubber longitudinally along the support means, means spaced above the support means for driving the wire elements into the tread rubber as it advances, means to move the element driving means transversely with respect to the longitudinal axis of the tread rubber whereby the insertion of the wire elements can be coordinated with a particular tread design, and means cooperable with the element driving means to control the longitudinal spacing of the elements.

2. Apparatus as defined in claim 1 wherein the means to move the element driving means transversely includes a tread design cam and a cam follower operably connected to the element driving means.

3. Apparatus as defined in claim 1 wherein the element driving means includes a carriage movable in guideways disposed at right angles to the direction of travel of the tread rubber.

4. Apparatus as defined in claim 3 wherein the movable carriage supports a plurality of wire elements driving heads.

5. An apparatus for inserting wire elements in tread rubber having a tread design, a bench for supporting the tread rubber, drive rollers for advancing the tread rubber longitudinally along the bench, means spaced above the bench for driving the wire elements into the tread rubber as it advances, said last-named means including a carriage movable in guideways disposed at right angles to the direction of travel of the tread rubber, means to move the carriage in a predetermined pattern in the guideways whereby the insertion of the wire elements can be coordinated with the tread design, and means cooperable with one of the drive rollers for controlling the spacing of the elements.

6. Apparatus as defined in claim 5 wherein the means for moving the carriage in a predetermined pattern in the guideways includes a tread design cam operably connected to one of the drive rollers and a cam follower operably connected to the carriage.

7. Apparatus as defined in claim 5 wherein the carriage supports a plurality of fluid operated wire element driving heads.

8. Apparatus as defined in claim 5 wherein one of the drive rollers has extending about its circumference a design in relief that complements the design in the tread rubber, the two designs being adapted to mesh whereby the tread rubber is precisely positioned as it advances along the bench.

* * * * *